US012800951B2

(12) United States Patent
Otake et al.

(10) Patent No.: US 12,800,951 B2
(45) Date of Patent: Nov. 17, 2026

(54) OPTICAL COMPUTING DEVICE WITH OPTICAL COORDINATION BETWEEN CORRESPONDING IMAGE SENSORS AND OPTICAL PHASE MODULATORS AND METHOD FOR CONTROLLING SUCH OPTICAL COMPUTING DEVICE

(71) Applicant: FUJIKURA LTD., Tokyo (JP)

(72) Inventors: Mamoru Otake, Tokyo (JP); Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 299 days.

(21) Appl. No.: 18/839,586

(22) PCT Filed: Feb. 6, 2023

(86) PCT No.: PCT/JP2023/003772

§ 371 (c)(1),
(2) Date: Aug. 19, 2024

(87) PCT Pub. No.: WO2023/157694

PCT Pub. Date: Aug. 24, 2023

(65) Prior Publication Data

US 2025/0155735 A1 May 15, 2025

(30) Foreign Application Priority Data

Feb. 21, 2022 (JP) ................................ 2022-025020

(51) Int. Cl.
*G02F 1/01* (2006.01)
*G02B 27/10* (2006.01)

(52) U.S. Cl.
CPC .............. *G02F 1/011* (2013.01); *G02B 27/10* (2013.01)

(58) Field of Classification Search
CPC .......... G02F 1/001; G02F 1/0136; G02F 3/02; G02B 27/10; G06E 3/00; G06E 3/001;
(Continued)

(56) References Cited

U.S. PATENT DOCUMENTS 3,809,873 A * 5/1974 Klahr .................. G01S 13/9005
359/560
7,847,225 B2 12/2010 Yokoyama
(Continued)

FOREIGN PATENT DOCUMENTS

EP 3686815 A1 7/2020
JP 2007-171422 A 7/2007
(Continued)

OTHER PUBLICATIONS

International Search Report issued in corresponding International Application No. PCT/JP2023/003772, mailed Mar. 28, 2023 (4 pages).

(Continued)

*Primary Examiner* — Andrew Jordan
(74) *Attorney, Agent, or Firm* — Osha Bergman Watanabe & Burton LLP

(57) ABSTRACT

An optical computing device includes an image sensor including one or more light receiving cells, one or more optical modulation elements each including cells that each have a phase-modulation amount, an optical splitter element that splits signal light into monitoring signal light entering the image sensor and computing signal light entering the one or more optical modulation elements, and a controller that independently sets the phase-modulation amount of each of the cells in accordance with an intensity of the monitoring signal light detected by a corresponding one of the light receiving cells of the image sensor.

8 Claims, 6 Drawing Sheets

(58) Field of Classification Search
CPC .. G06G 7/60; G06N 3/04; G06N 3/08; G06N 3/0675
See application file for complete search history.

(56) References Cited

U.S. PATENT DOCUMENTS

| | | | | |
|---|---|---|---|---|
| 2021/0287079 | A1 | 9/2021 | Poli et al. | |
| 2025/0155735 | A1* | 5/2025 | Otake | G02F 1/011 |
| 2026/0016850 | A1* | 1/2026 | Asaoka | G06E 3/005 |

FOREIGN PATENT DOCUMENTS

| | | | |
|---|---|---|---|
| JP | 2009-246578 | A | 10/2009 |
| JP | 2014-52948 | A | 3/2014 |

OTHER PUBLICATIONS

International Preliminary Report on Patentability issued in corresponding International Application No. PCT/JP2023/003772, mailed Aug. 27, 2024 (7 pages).

* cited by examiner

OPTICAL COMPUTING DEVICE WITH OPTICAL COORDINATION BETWEEN CORRESPONDING IMAGE SENSORS AND OPTICAL PHASE MODULATORS AND METHOD FOR CONTROLLING SUCH OPTICAL COMPUTING DEVICE

BACKGROUND

Technical Field

The present invention relates to an optical computing device including an optical modulation element and a method for controlling the optical computing device.

Discussion of the Background

There has been known an optical modulation element which has a plurality of cells and which is designed to optically perform predetermined computing by causing signal light beams having respectively passed through the plurality of cells to interfere with each other. Optical computing carried out with use of such an optical modulation element has an advantage of achieving higher speed and lower electric power consumption as compared with electrical computing carried out with use of a processor. Further, multiple-stage optical computing can be achieved by causing two or more optical modulation elements arranged side by side to sequentially act on the signal light.

Patent Literature 1 discloses an optical neural network having an input layer, an intermediate layer, and an output layer. The above-described optical modulation element can be used as, for example, the intermediate layer of such an optical neural network.

PATENT LITERATURE

Patent Literature 1: U.S. Pat. No. 7,847,225

However, the phase modulation carried out in each cell of the optical modulation element is linear phase modulation ($\varphi \rightarrow \varphi + \Delta\varphi$) in which a predetermined phase $\Delta\varphi$ is added to a phase $\varphi$ of signal light that has not been modulated. As such, optical computing that can be realized by the optical modulation element is only limited. For example, threshold computation carried out with use of an activation function in each neuron included in a neural network is difficult to achieve with use of the optical modulation element.

SUMMARY

One or more embodiments provide an optical computing device that can carry out a wider variety of optical computing in comparison to a conventional optical computing device which carries out linear phase modulation at each cell of an optical modulation element.

An optical computing device in accordance with one or more embodiments is an optical computing device, including: an image sensor including one or more light receiving cells; an optical modulation element including a plurality of cells having respective phase-modulation amounts that are settable independently of each other; an optical splitter element that splits signal light into signal light for monitoring (monitoring signal light) and signal light for computing (computing signal light), the signal light for monitoring entering the image sensor, the signal light for computing entering the optical modulation element; and a control section (example of a controller) that sets a phase-modulation amount of each of the plurality of cells of the optical modulation element in accordance with an intensity of the signal light for monitoring which intensity is detected by a light receiving cell of the image sensor, the light receiving cell corresponding to the each of the plurality of cells.

A control method in accordance with one or more embodiments is a method for controlling an optical computing device, the optical computing device including: an image sensor including one or more light receiving cells; an optical modulation element including a plurality of cells having respective phase-modulation amounts that are settable independently of each other; and an optical splitter element that splits signal light into signal light for monitoring and signal light for computing, the signal light for monitoring entering the image sensor, the signal light for computing entering the optical modulation element, the method including the step of setting a phase-modulation amount of each of the plurality of cells of the optical modulation element in accordance with an intensity of the signal light for monitoring which intensity is detected by a light receiving cell of the image sensor, the light receiving cell corresponding to the each of the plurality of cells.

According to one or more embodiments, it is possible to provide an optical computing device that can carry out a wider variety of optical computing in comparison to a conventional optical computing device which carries out linear phase modulation at each cell of an optical modulation element.

DESCRIPTION OF THE EMBODIMENTS (Configuration of Optical Computing Device)

Figure 1:
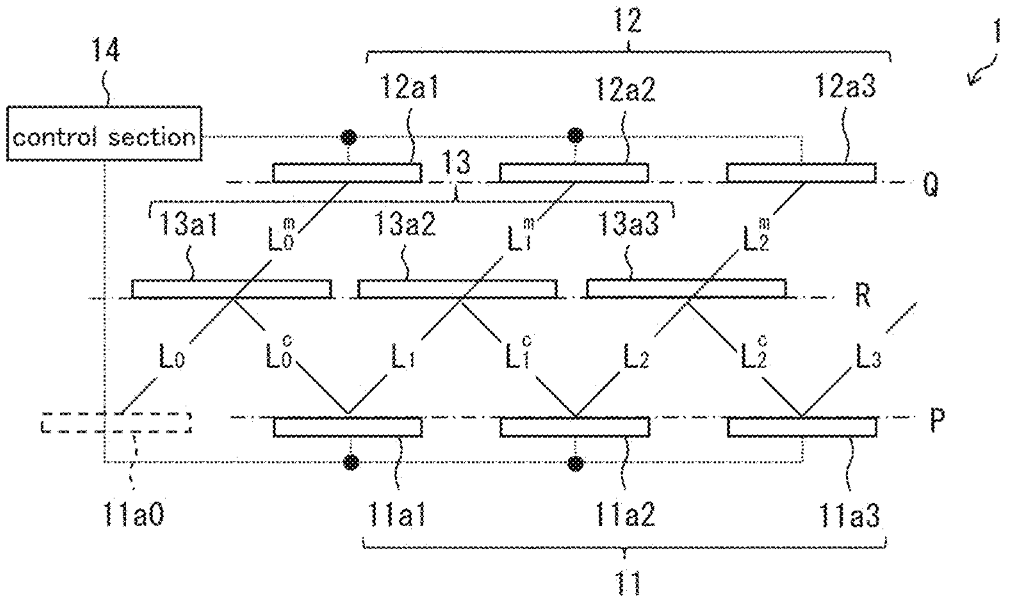
FIG. 1 is a block diagram illustrating a configuration of an optical computing device in accordance with one or more embodiments.

With reference to FIG. 1, the following will describe a configuration of an optical computing device 1 in accordance with one or more embodiments. FIG. 1 is a block diagram illustrating a configuration of the optical computing device 1.

As illustrated in FIG. 1, the optical computing device 1 includes an optical modulation element group 11, an image sensor group 12, an optical splitter element group 13, and a control section (example of a controller) 14.

The optical modulation element group 11 is a set of one or more reflective optical modulation elements 11*a*1 to 11*an* (n is any natural number of not less than 1). In one or more embodiments, in order to realize multiple-stage optical computing, a set of three optical modulation elements 11*a*1 to 11*a*3 are used as the optical modulation element group 11. A reflective optical modulation element 11*ai* (i is a natural number of not less than 1 and not more than n) is a plate-like element including a plurality of cells having respective phase-modulation amounts that are settable independently of each other, and carries out optical computing such that (i) signal light beams are reflected by the respective cells while being phase-modulated and (ii) the signal light beams thus reflected are caused to interfere with each other. Note here that "carrying out optical computing" means to convert a two-dimensional intensity distribution of signal light, from a two-dimensional intensity distribution representing information before computing into a two-dimensional intensity distribution representing information after the computing. An example configuration of the reflective optical modulation element 11*ai* will be described later with reference to another drawing.

In one or more embodiments, the optical modulation elements 11*a*1 to 11*an* are arranged in a row such that respective one main surfaces of the optical modulation elements 11*ai* (entrance/exit surfaces for signal light) are on an identical plane P. The optical modulation elements 11*a*1 to 11*an* may be integrated together. For example, the optical modulation elements 11*a*1 to 11*an* may be embedded in a single substrate, or n regions of a single optical modulation element may be used as the optical modulation elements 11*a*1 to 11*an*. Alternatively, n light diffraction layers formed inside a structure that allows signal light to pass therethrough, such as a dried gel may be used as the optical modulation elements 11*a*1 to 11*an*.

The image sensor group 12 is a set of image sensors 12*a*1 to 12*an*, the number of which is the same as the number of the optical modulation elements 11*a*1 to 11*an*. In FIG. 1, a set of three image sensors 12*a*1 to 12*a*3 is illustrated as an example of the image sensor group 12. Each image sensor 12*ai* is a plate-like element including one or more light receiving cells, and detects a two-dimensional intensity distribution of signal light. In one or more embodiments, the cells of the optical modulation element 11*ai* are in a one-to-one correspondence to the light receiving cells of the image sensor 12*ai*. For example, in a case where the optical modulation element 11*ai* includes 200×200 cells arranged in matrix, the image sensor 12*ai* also includes 200×200 light receiving cells arranged in matrix. As such, an intensity of signal light entering each cell of the optical modulation element 11*ai* is detected by a light receiving cell of the image sensor 12*ai* which light receiving cell corresponds to the cell. Note that specific examples of each of the image sensors 12*a*1 to 12*an* include a charge coupled device (CCD) camera and a complementary metal oxide semiconductor (CMOS) camera.

In one or more embodiments, the image sensors 12*a*1 to 12*an* are arranged in a row such that respective one main surfaces of the image sensors 12*ai* (entrance surfaces for signal light) are on an identical plane Q. Note that the plane Q is a plane parallel to the plane P described above. Note that the image sensors 12*a*1 to 12*an* may be integrated together. For example, the image sensors 12*a*1 to 12*an* may be embedded in a single substrate, or n regions of a single optical image sensor may be used as the image sensors 12*a*1 to 12*an*.

The optical splitter element group 13 is a set of optical splitter elements 13*a*1 to 13*an* the number of which is the same as the number of the optical modulation elements 11*a*1 to 11*an*. In FIG. 1, a set of three optical splitter elements 13*a*1 to 13*a*3 is illustrated as an example of the optical splitter element group 13. Each optical splitter element 13*ai* splits signal light into signal light for monitoring and signal light for computing. Each optical splitter element 13*ai* may be a half mirror, or may be a beam splitter.

In one or more embodiments, the optical splitter elements 13*a*1 to 13*an* are arranged in a row such that respective reflective surfaces of the optical splitter elements 13*ai* are on an identical plane R. Note that the plane R is a plane that is located between the plane P and the plane Q described above and parallel to the plane P and the plane Q described above.

The control section 14 is a configuration for setting a phase-modulation amount of each cell of the optical modulation element 11*ai* in accordance with an intensity of signal light which intensity is detected by a light receiving cell of the image sensor 12*ai*, the light receiving cell corresponding to the cell. In one or more embodiments, the control section 14 is a microcomputer which is an aspect of a computer. Note that, in one or more embodiments, the control section 14 can be a personal computer which is another aspect of a computer, or can be an integrated circuit. In a case where the control section 14 is an integrated circuit, the integrated circuit may be one which has a rewritable logic circuit (e.g. a field-programmable gate array (FPGA)) or may be one which has a non-rewritable logic circuit. The non-rewritable integrated circuit is a set of electronic circuits, constituted by a resister, an amplifier, and the like. That is, non-rewritable integrated circuit is an integrated circuit. The control section 14 constituted by such an integrated circuit will be described later with reference to FIGS. 7 and 8.

Signal light $L_0$ inputted to the optical computing device 1 is split by the optical splitter element 13*a*1 into signal light $L_0^m$ for monitoring and signal light $L_0^c$ for computing. The signal light $L_0^m$ for monitoring is signal light that has passed through the optical splitter element 13*a*1, and the signal light $L_0^c$ for computing is signal light that has been reflected by the optical splitter element 13*a*1. The signal light $L_0^m$ for monitoring enters the image sensor 12*a*1. The signal light $L_0^c$ for computing enters the optical modulation element 11*a*1. At this time, the control section 14 sets a phase-modulation amount of each cell of the optical modulation element 11*a*1, which acts on the signal light $L_0^c$ for computing, in accordance with an intensity of the signal light $L_0^m$ for monitoring which intensity is detected by a light receiving cell of the image sensor 12*a*1, the light receiving cell corresponding to the cell.

Signal light $L_1$ which has been reflected by the optical modulation element 11*a*1 is split by the optical splitter element 13*a*2 into signal light $L_1^m$ for monitoring and signal light $L_1^c$ for computing. The signal light $L_1^m$ for monitoring is signal light that has passed through the optical splitter element 13*a*2, and the signal light $L_1^c$ for computing is signal light that has been reflected by the optical splitter element 13*a*2. The signal light $L_1^m$ for monitoring enters the image sensor 12*a*2. The signal light $L_1^c$ for computing enters the optical modulation element 11*a*2. At this time, the control section 14 sets a phase-modulation amount of each cell of the optical modulation element 11*a*2, which acts on the signal light $L_1^c$ for computing, in accordance with an intensity of the signal light $L_1^m$ for monitoring which intensity is detected by a light receiving cell of the image sensor 12*a*2, the light receiving cell corresponding to the cell.

Signal light $L_2$ which has been reflected by the optical modulation element 11*a*2 is split by the optical splitter element 13*a*3 into signal light $L_2^m$ for monitoring and signal light $L_2^c$ for computing. The signal light $L_2^m$ for monitoring is signal light that has passed through the optical splitter element 13*a*3, and the signal light $L_2^c$ for computing is signal light that has been reflected by the optical splitter element 13*a*3. The signal light $L_2^m$ for monitoring enters the image sensor 12*a*3. The signal light $L_2^c$ for computing enters the optical modulation element 11*a*3. At this time, the control section 14 sets a phase-modulation amount of each cell of the optical modulation element 11*a*3, which acts on the signal light $L_2^c$ for computing, in accordance with an intensity of the signal light $L_2^m$ for monitoring which intensity is detected by a light receiving cell of the image sensor 12*a*3, the light receiving cell corresponding to the cell.

Signal light $L_3$ which has been reflected by the optical modulation element 11*a*3 is outputted to an outside as signal light indicative of a result of computation carried out by the optical computing device 1.

Note that although one or more embodiments employ a configuration in which signal light $L_0$ indicative of input information is inputted into the optical computing device 1, the present invention is not limited to this. For example, it is possible to employ a configuration in which an electrical signal indicative of input information and carrier light are inputted into the optical computing device 1. In this case, for example, an optical modulation element 11*a*0 (indicated by broken lines in FIG. 1) may be added to a stage preceding the optical modulation element 11*a*1, the optical modulation element 11*a*0 carrying out optical modulation of the carrier light with use of the electrical signal indicative of the input information to thereby generate signal light $L_0$ indicative of an input signal.

A phase-modulation amount of each cell of an optical modulation element included in a conventional optical computing device is constant regardless of an intensity (light intensity) P of signal light that enters the cell. As such, when a phase of signal light that enters the cell is represented as φ and a phase-modulation amount in the cell is represented as Δφ, a phase φ' of signal light that exits the cell is given by φ'=φ+Δφ (constant). In other words, in a case where the signal light that enters the cell is expressed by a complex number $P \times e^{i \times \varphi}$, the signal light that exits the cell is expressed by a complex number $P \times e^{i \times \varphi} \times e^{i \times \Delta\theta}$.

In contrast, a phase-modulation amount of each cell of the optical modulation element 11*ai* included in the optical computing device 1 in accordance with one or more embodiments is determined in accordance with an intensity P of signal light $L_{i-1}^c$ for computing that enters the cell, i.e., an intensity P of signal light $L_{i-1}^m$ for monitoring which intensity P is detected by a light receiving cell of the image sensor 12*ai*, the light receiving cell corresponding to the cell. As such, when a phase of the signal light $L_{i-1}^c$ for computing that enters the cell is represented as φ and a phase-modulation amount in the cell is represented as A (P), a phase φ' of signal light $L_i$ that exits the cell is given by φ'=φ+Δφ(P). In other words, in a case where the signal light $L_{i-1}^c$ for computing that enters the cell is expressed by a complex number $Pe^{i\varphi}$, the signal light $L_i$ that exits the cell is expressed by a complex number $P \times e^{i \times \varphi} \times e^{i \times \Delta\theta}(P)$. As such, according to the optical computing device 1 in accordance with one or more embodiments, it is possible to carry out a wider variety of optical computing in comparison to a conventional optical computing device which carries out linear phase modulation at each cell of an optical modulation element.

Note that an intensity $P^c$ of the signal light $L_{i-1}^c$ for computing and an intensity $P^m$ of the signal light $L_{i-1}^m$ for monitoring may or may not coincide with each other. Even in the latter case, these intensities are in a proportional relationship of $P^c = \rho P^m$, and it is therefore possible to control a phase-modulation amount in accordance with the intensity $P^c$ of the signal light $L_{i-1}^c$ for computing. Note here that ρ is a constant determined in accordance with a ratio of division by the optical splitter element 13*ai* (a transmittance and a reflectance) and the like.

Note that, in one or more embodiments, the control section 14 sets the phase-modulation amount Δφ(P) of each cell of the optical modulation element 11*ai* in accordance with Δφ(P)=P×α+β. Note here that α and β are each a constant determined for each cell of the optical modulation element 11*ai*. Note, however, that the present invention is not limited to this. That is, the phase-modulation amount Δφ(P) of each cell and the intensity P of the signal light $L_{i-1}^m$ for monitoring detected by a light receiving cell of the image sensor 12*ai* which light receiving cell corresponds to the cell can be in any relationship with each other. For example, the control section 14 can set the phase-modulation amount Δσ(P) of each cell of the optical modulation element 11*ai* such that Δφ(P)=0 in a case where P<P0 and Δσ(P)=γ in a case where P≥P0. Note here that γ is a constant determined for each cell of the optical modulation element 11*ai*.

Note that a constant in the phase-modulation amount of each cell of the optical modulation element 11*ai* can be set, for example, through machine learning. A model used in this machine learning can be, for example, a model in which a two-dimensional intensity distribution of the signal light $L_0$ inputted into the optical modulation element 11*a*1 is an input, and a two-dimensional intensity distribution of signal light $L_n$ outputted from the optical modulation element 11*an* is an output and which includes a constant (in the above-described example, α, β, and γ) in a phase-modulation amount of each cell as a parameter. Note here that the two-dimensional intensity distribution of the signal light $L_0$ inputted into the optical modulation element 11*a*1 means, for example, a set of intensities of signal light beams inputted into the respective cells included in the optical modulation element 11*a*1. Further, the two-dimensional intensity distribution of the signal light $L_n$ outputted from the optical modulation element 11*an* means, for example, a set of intensities of signal light beams inputted into respective cells included in a two-dimensional image sensor provided in a stage subsequent to the optical modulation element 11*an*.

Note that the detection of the signal light $L_{i-1}^m$ for monitoring by each image sensor 12*ai*, the control of each optical modulation element 11*ai* by the control section 14, and the optical computing by each optical modulation element 11*ai* with respect to the signal light $L_{i-1}^c$ for computing are each a time-consuming process. As such, it takes time until respective phase-modulation amounts of all of the cells of each optical modulation element 11*ai* converge to a constant value and desired signal light $L_n$ is outputted from the optical computing device 1. From this point of view, it is preferable that the control section 14 output, after respective phase-modulation amounts of all of the cells of each optical modulation element 11*ai* converge to a constant value, a signal (which may be an optical signal or may be an electrical signal) that indicates that signal light $L_n$ indicative of a correct result of computation is outputted. This makes it possible to reduce a risk that an output destination to which this signal is outputted refers to signal light $L_n$ indicative of an incorrect result of computation, which signal light $L_n$ can be outputted from the optical computing device 1 before respective phase-modulation amounts of all of the cells of each optical modulation element 11*ai* converge to a constant value. Note that examples of the output destination to which the signal is outputted include a control section of a device that uses information indicated by the signal light $L_n$ (the control section may be a computer connected to the device, or may be a microcomputer or an integrated circuit incorporated in the device).

Further, although one or more embodiments employ a configuration in which cells of the optical modulation element 11*ai* are in a one-to-one correspondence to the light receiving cells of the image sensor 12*ai*, the present invention is not limited to this. For example, it is possible to employ a configuration in which the cells of the optical modulation element 11*ai* are in a one-to-K correspondence to the light receiving cells of the image sensor 12*ai* (K is a natural number of not less than 2). In this case, the control section 14 sets a phase-modulation amount Δφ(P) of each cell of the optical modulation element 11*ai* in accordance with respective intensities P of signal light beams $L_{i-1}^m$ for monitoring which intensities P are detected by K light receiving cells of the image sensor 12*ai*, the K light receiving cells corresponding to the cell. A case in which K=4 will be described later with reference to (b) of FIG. 7. Alternatively, it is possible to employ a configuration in which the cells of the optical modulation element 11*ai* are in an L-to-one correspondence to the light receiving cells of the image sensor 12*ai* (L is a natural number of not less than 2). In this case, the control section 14 sets respective phase-modulation amounts Δφ(P) of L cells of the optical modulation element 11*ai* in accordance with an intensity P of signal light $L_{i-1}^m$ for monitoring which intensity P is detected by a single light receiving cell of the image sensor 12*ai*, the single light receiving cell corresponding to those cells. Note that L can be a total number of cells included in the optical modulation element 11*ai*. In this case, respective phase-modulation amounts Δφ(P) of all of the cells of the optical modulation element 11*ai* are set in accordance with an intensity P of signal light $L_{i-1}^m$ for monitoring which intensity P is detected by a single light receiving cell of the image sensor 12*ai*, the single light receiving cell corresponding to those cells.

Further, in a case where n light diffraction layers formed inside a dried gel are used as the optical modulation elements 11*a*1 to 11*an*, it is preferable to use a gel that is subjected to dehydration shrinkage so that the gel shrinks while keeping a similar shape, e.g., a gel used in the Implosion Fabrication process. This makes it possible to, by drying a swollen gel in which n light diffraction layers are formed, easily manufacture the optical modulation element group 11 in which the optical modulation elements 11*a*1 to 11*an* are arranged with high precision.

(Example Configuration of Reflective Optical Modulation Element)

Figure 3:
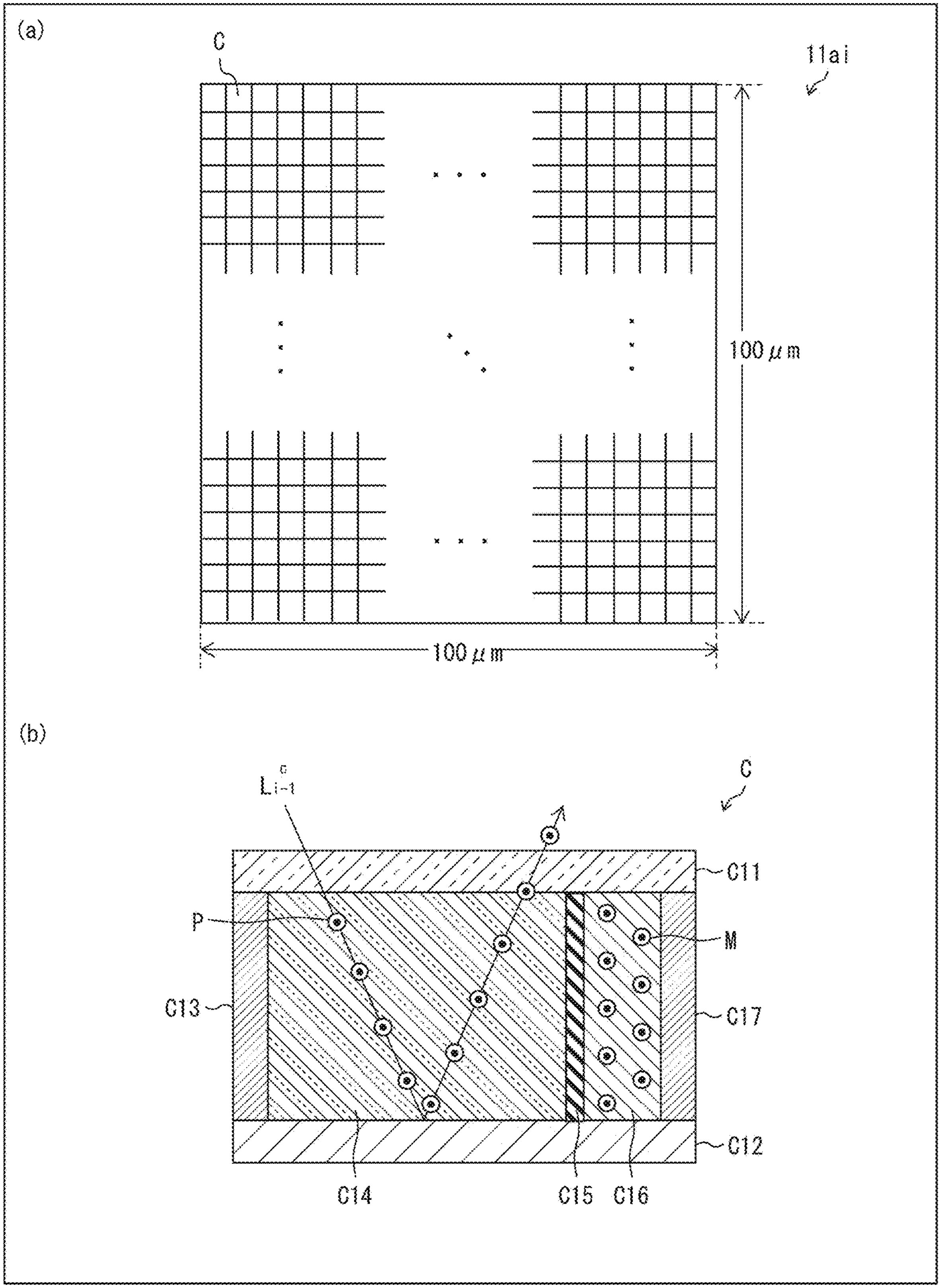
FIG. 3 shows a plan view illustrating a reflective optical modulation element included in the optical computing device illustrated in FIG. 1 and a cross-sectional view of a cell included in the optical modulation element.

The following description will discuss, with reference to FIG. 3, an example configuration of a reflective optical modulation element 11*ai* included in the optical computing device 1. (a) of FIG. 3 is a plan view of an optical modulation element 11*ai* in accordance with the present specific example. (b) of FIG. 3 is a cross-sectional view of a microcell C included in the optical modulation element 11*ai* in accordance with the present specific example.

As shown in (a) of FIG. 3, the optical modulation element 11*ai* includes a plurality of microcells C having respective phase-modulation amounts that are set independently of each other. When signal light $L_{i-1}^c$ for computing enters the optical modulation element 11*ai*, the signal light $L_{i-1}^c$ for computing is reflected by the microcells C while being phase-modulated, and signal light beams $L_{i-1}^c$ for computing thus phase-modulated by the microcells C interfere with each other. Consequently, signal light $L_i$ indicative of a result of computation is formed.

In the present specification, “microcell” means a cell having a cell size of less than 10 μm, for example. Further, “cell size” means a square root of an area of a cell. For example, given that the microcell C is in the form of a square in a plan view, a cell size of the microcell C means a length of one side of the microcell C. A lower limit of the cell size of the microcell C is 1 nm, for example.

The optical modulation element 11*ai* shown in (a) of FIG. 3 as an example includes 200×200 microcells C arranged in matrix. A shape of each microcell C in a plan view is a square of 500 nm×500 nm. A shape of the optical modulation element 11*ai* in a plan view is a square of 100 μm×100 μm.

For example, as shown in (b) of FIG. 3, each microcell C included in the optical modulation element 11*ai* may include a polarizing plate C11, a reflecting plate C12, a first electrode C13, a magnetization free layer C14, an insulating layer C15, a magnetization fixed layer C16, and a second electrode C17.

The polarizing plate C11 and the reflecting plate C12 are disposed opposite to each other. The first electrode C13, the magnetization free layer C14, the insulating layer C15, the magnetization fixed layer C16, and the second electrode C17 are stacked in this order, and are sandwiched between the polarizing plate C11 and the reflecting plate C12. Here, a direction in which the first electrode C13, the magnetization free layer C14, the insulating layer C15, the magnetization fixed layer C16, and the second electrode C17 are stacked is orthogonal to a direction in which the polarizing plate C11 and the reflecting plate C12 are stacked. Thus, a first side surface of the magnetization free layer C14 is in surface contact with one of main surfaces of the polarizing plate C11, and a second side surface of the magnetization free layer C14 which is located opposite to the first side surface is in surface contact with one of main surfaces of the reflecting plate C12. The signal light $L_{i-1}^c$ for computing (1) enters an inside of the magnetization free layer C14 via the polarizing plate C11, (2) is reflected by the reflecting plate C12, and (3) is emitted through the polarizing plate C11 to an outside of the magnetization free layer C14.

The magnetization free layer C14 is made of, for example, a soft magnetic material having electric conductivity and light transmissivity (for example, CoFeB). The magnetization fixed layer C16 is made of, for example, a hard magnetic material having electric conductivity (for example, permalloy). Selected as the polarizing plate C11 is a polarizing plate that selectively allows, to pass therethrough, a polarized light component having a polarization direction P parallel to a magnetization direction M of the magnetization fixed layer C16. (b) of FIG. 3 takes as an example a case in which the magnetization direction M and the polarization direction P are parallel to both (i) the main surfaces of the polarizing plate C11 and (ii) main surfaces of the magnetization fixed layer C16.

When a potential difference is provided between the first electrode C13 and the second electrode C17, a tunnel effect occurs and injects a spin current (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is magnetization parallel to the magnetization direction M of the magnetization fixed layer C16, that is, magnetization parallel to the polarization direction P of the signal light $L_{i-1}^c$ for computing which enters the magnetization free layer C14 through the polarizing plate C11. This causes a phase of the signal light $L_{i-1}^c$ for computing to be delayed by a transverse Kerr effect during a process of transmission in the magnetization free layer C14.

Here, a phase-shift amount of the signal light $L_{i-1}^c$ for computing in the cell C is determined depending on a magnitude of the magnetization in the magnetization free layer C14. The magnitude of the magnetization in the magnetization free layer C14 is determined depending on a magnitude of the spin current injected into the magnetization free layer C14. The magnitude of the spin current injected into the magnetization free layer C14 is determined depending on the potential difference provided between the first electrode C13 and the second electrode C17. Thus, controlling the potential difference provided between the first electrode C13 and the second electrode C17 enables the phase-modulation of the cell C to be set to a desired value.

Although the description in the present configuration example has discussed a microcell C having a configuration similar to that of a spin transfer torque (STT)-magnetoresistive random access memory (MRAM), this should not be construed as a limitation. For example, a microcell C having a configuration similar to a spin orbit torque (SOT)-MRAM may be used. Note that such a microcell C can be achieved by, for example, removing the insulating layer C15, the magnetization fixed layer C16, and the second electrode C17 from the structure shown in (b) of FIG. 3. In this case, for example, causing the first electrode C13 to contain heavy metal and providing a pulse voltage or a pulse current to the first electrode C13 enables the spin current to be efficiently injected into the magnetization free layer C14.

Figure 5:
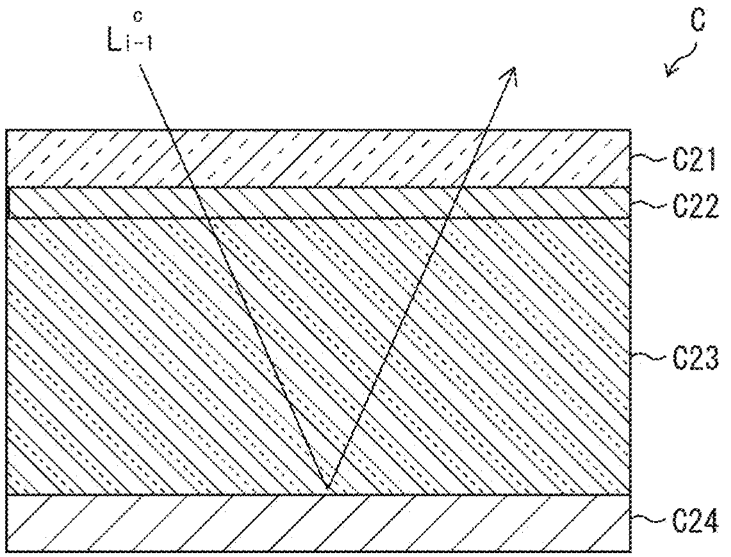
FIG. 5 is a cross-sectional view illustrating another reflective optical modulation element included in the optical computing device illustrated in FIG. 1.

Further, the cell C can be configured in a similar manner to a cell of a liquid crystal on silicon (LCOS). In this case, the cell C includes, for example, a glass substrate C21, a transparent electrode C22, a liquid crystal layer C23, and a reflective electrode C24 as illustrated in FIG. 5. The glass substrate C21, the transparent electrode C22, the liquid crystal layer C23, and the reflective electrode C24 are stacked in this order from a side from which signal light $L_{i-1}^c$ for computing enters.

The signal light $L_{i-1}^c$ for computing (1) passes through the glass substrate C21 and the transparent electrode C22, (2) passes through the liquid crystal layer C23, (3) is reflected by the reflective electrode C24, (4) passes through the liquid crystal layer C23, and (5) passes through the transparent electrode C22 and the glass substrate C21. The liquid crystal layer C23 is made of liquid crystal molecules oriented in a direction parallel to main surfaces of the glass substrate C21, and has a refractive index according to a potential difference between the transparent electrode C22 and the reflective electrode C24. As such, the signal light $L_{i-1}^c$ for computing is phase-modulated when passing through the liquid crystal layer C23. A phase-modulation amount of the cell C can be set to a desired value by controlling a potential difference given between the transparent electrode C22 and the reflective electrode C24.

(Variation of Optical Computing Device)

Figure 2:
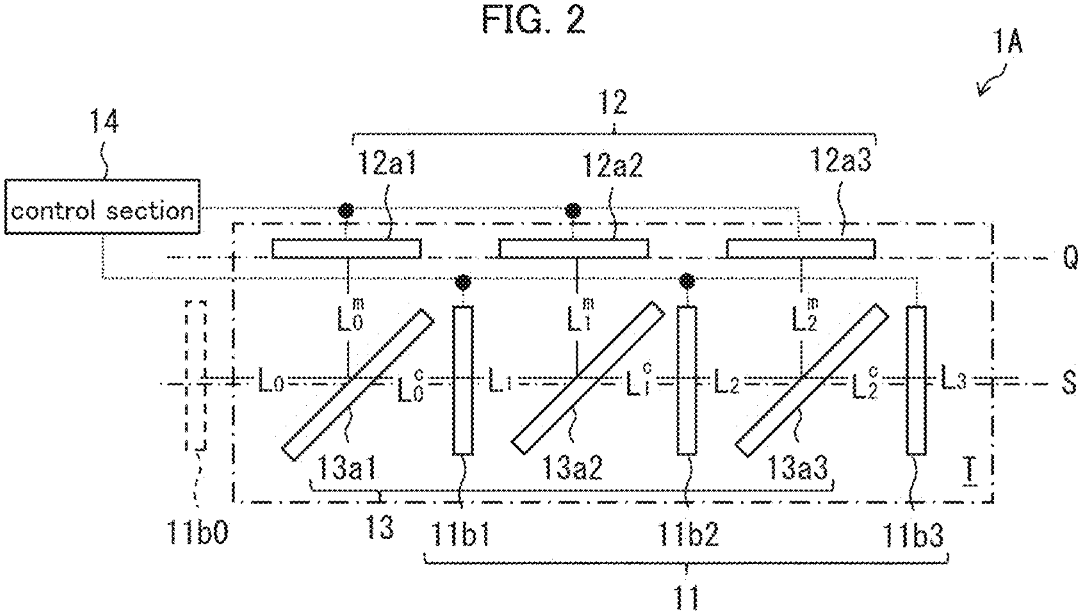
FIG. 2 is a block diagram illustrating a variation of the optical computing device illustrated in FIG. 1.

The following description will discuss, with reference to FIG. 2, a variation (hereinafter referred to as an optical computing device 1A) of the optical computing device 1. FIG. 2 is a block diagram illustrating a configuration of the optical computing device 1A.

The optical computing device 1A includes an optical modulation element group 11, an image sensor group 12, an optical splitter element group 13, and a control section 14, similarly as the optical computing device 1. The difference between the optical computing device 1 and the optical computing device 1A is (1) the optical modulation element group 11 which includes transmissive optical modulation elements 11*b*1 to 11*bn* and (2) positional arrangement of the optical modulation elements 11*b*1 to 11*bn* included in the optical modulation element group 11 and optical splitter elements 13*a*1 to 13*an* included in the optical splitter element group 13.

A transmissive optical modulation element 11*bi* includes a plurality of cells having respective phase-modulation amounts that are settable independently of each other, and carries out optical computing such that (i) the signal light beams pass through the respective cells while being phase-modulated and (ii) the signal light beams that have passed through the respective cells are caused to interfere with each other. An example configuration of the transmissive optical modulation element 11*bi* will be described later with reference to another drawing.

In the present variation, the optical modulation elements 11*b*1 to 11*bn* are arranged in a row on a straight line S such that main surfaces of each optical modulation element 11*bi* (an entrance surface and an exit surface for signal light) are orthogonal to a plane Q. Note that the plane Q is a plane on which one main surface of each image sensor 12*ai* (an entrance surface for signal light) is provided, and the straight line S is a straight line that is parallel to the plane Q.

The optical splitter element 13*a*1 is provided on the straight line S in a stage preceding the optical modulation element 11*b*1. An optical splitter element 13*aj* (j is a natural number of not less than 2 and not more than n) is provided on the straight line S in a stage that is subsequent to an optical modulation element 11*bj*-1 and that precedes an optical modulation element 11*bj*. An orientation of the optical splitter element 13*ai* is determined such that: a normal line of a reflective surface of the optical splitter element 13*ai* is contained in a plane T; the reflective surface of the optical splitter element 13*ai* and the straight line S form an angle of 45° therebetween; and signal light $L_{i-1}^m$ for monitoring is directed to the image sensor 12*ai*. Note that the plane T is a plane that contains the straight line S and that is orthogonal to the plane Q.

Signal light $L_0$ inputted to the optical computing device 1A is split by the optical splitter element 13*a*1 into signal light $L_0^m$ for monitoring and signal light $L_0^c$ for computing. The signal light $L_0^m$ for monitoring is signal light that has been reflected by the optical splitter element t 13*al*, and the signal light $L_0^c$ for computing is signal light that has passed through the optical splitter element 13*a*1. The signal light $L_0^m$ for monitoring enters the image sensor 12*a*1. The signal light $L_0^c$ for computing enters the optical modulation element 11*b*1. At this time, the control section 14 sets a phase-modulation amount of each cell of the optical modulation element 11*b*1, which acts on the signal light $L_0^c$ for computing, in accordance with an intensity of the signal light $L_0^m$ for monitoring which intensity is detected by a light receiving cell of the image sensor 12*a*1, the light receiving cell corresponding to the cell.

Signal light $L_1$ which has passed through the optical modulation element 11*b*1 is split by the optical splitter element 13*a*2 into signal light $L_1^m$ for monitoring and signal light $L_1^c$ for computing. The signal light $L_1^m$ for monitoring is signal light that has been reflected by the optical splitter element 13*a*2, and the signal light $L_1^c$ for computing is signal light that has passed through the optical splitter element 13*a*2. The signal light $L_1^m$ for monitoring enters an image sensor 12*a*2. The signal light $L_1^c$ for computing enters an optical modulation element 11*b*2. At this time, the control section 14 sets a phase-modulation amount of each cell of the optical modulation element 11*b*2, which acts on the signal light $L_1^c$ for computing, in accordance with an intensity of the signal light $L_1^m$ for monitoring which intensity is detected by a light receiving cell of the image sensor 12*a*2, the light receiving cell corresponding to the cell.

Signal light $L_2$ which has passed through the optical modulation element 11*b*2 is split by an optical splitter element 13*a*3 into signal light $L_2^m$ for monitoring and signal light $L_2^\circ$ for computing. The signal light $L_2^m$ for monitoring is signal light that has been reflected by the optical splitter element 13*a*3, and the signal light $L_2^c$ for computing is signal light that has passed through the optical splitter element 13*a*3. The signal light $L_2^m$ for monitoring enters an image sensor 12*a*3. The signal light $L_2^c$ for computing enters an optical modulation element 11*b*3. At this time, the control section 14 sets a phase-modulation amount of each cell of the optical modulation element 11*b*3, which acts on the signal light $L_2^c$ for computing, in accordance with an intensity of the signal light $L_2^m$ for monitoring which intensity is detected by a light receiving cell of the image sensor 12*a*3, the light receiving cell corresponding to the cell.

Signal light $L_3$ which has passed through the optical modulation element 11*b*3 is outputted to an outside as signal light indicative of a result of computation carried out by the optical computing device 1A.

Note that although one or more embodiments employ a configuration in which signal light $L_0$ indicative of input information is inputted into the optical computing device 1A, the present invention is not limited to this. For example, it is possible to employ a configuration in which an electrical signal indicative of input information and carrier light are inputted into the optical computing device 1A. In this case, for example, an optical modulation element 11*b*0 (illustrated with use of broken lines in FIG. 2), which carries out optical modulation of the carrier light with use of the electrical signal indicative of the input information to thereby generate signal light $L_0$ indicative of an input signal, may be added to a stage preceding the optical modulation element 11*b*1.

A phase-modulation amount of each cell of the optical modulation element 11*bi* included in the optical computing device 1A in accordance with the present variation is determined in accordance with an intensity P of signal light $L_{i-1}^c$ for computing that enters the cell, i.e., an intensity P of signal light $L_{i-1}^m$ for monitoring which intensity P is detected by a light receiving cell of the image sensor 12*ai*, the light receiving cell corresponding to the cell. As such, when a phase of signal light $L_{i-1}^c$ for computing that enters the cell is represented as $\varphi$ and a phase-modulation amount in the cell is represented as $\Delta\varphi(P)$, a phase $\varphi'$ of signal light $L_i$ that exits the cell is given by $\varphi'=\varphi+\Delta\varphi(P)$. In other words, when signal light $L_{i-1}^c$ for computing that enters each cell is expressed by a complex number $Pe^{i\varphi}$, signal light $L_i$ that exits the cell is expressed by a complex number $Pe^{i\varphi}\times e^{i\Delta\theta}(P)$. As such, according to the optical computing device 1A in accordance with the present variation, it is possible to carry out a wider variety of optical computing in comparison to a conventional optical computing device which carries out linear phase modulation at each cell of an optical modulation element.

Note that an intensity $P^c$ of the signal light $L_{i-1}^c$ for computing and an intensity $P^m$ of the signal light $L_{i-1}^m$ for monitoring may or may not coincide with each other. Even in the latter case, these intensities are in a proportional relationship of $P^c=\rho P^m$, and it is therefore possible to control a phase-modulation amount in accordance with the intensity $P^c$ of the signal light $L_{i-1}^c$ for computing. Note here that $\rho$ is a constant determined in accordance with a ratio of division by the optical splitter element 13*ai* (a transmittance and a reflectance) and the like.

Note that, in the present variation, the control section 14 sets a phase-modulation amount $\Delta\varphi(P)$ of each cell of the optical modulation element 11*bi* in accordance with $\Delta\varphi(P)=P\times\alpha+\beta$. Note here that $\alpha$ and $\beta$ are each a constant determined for each cell of the optical modulation element 11*bi*. Note, however, that the present invention is not limited to this. That is, the phase-modulation amount $\Delta\varphi(P)$ of each cell and the intensity P of the signal light $L_{i-1}^m$ for monitoring detected by a light receiving cell of the image sensor 12*ai* which light receiving cell corresponds to the cell can be in any relationship with each other. For example, the control section 14 can set the phase-modulation amount $\Delta\varphi(P)$ of each cell of the optical modulation element 11*bi* such that $\Delta\varphi(P)=0$ in a case where $P<P0$ and $\Delta\varphi(P)=\gamma$ in a case where $P\geq P0$. Note here that $\gamma$ is a constant determined for each cell of the optical modulation element 11*bi*.

Note that a constant in the phase-modulation amount of each cell of the optical modulation element 11*bi* can be set, for example, through machine learning. A model used in this machine learning can be, for example, a model in which a two-dimensional intensity distribution of the signal light $L_0$ inputted into the optical modulation element 11*b*1 is an input, and a two-dimensional intensity distribution of signal light $L_n$ outputted from the optical modulation element 11*bn* is an output and which includes a constant (in the above-described example, $\alpha$, $\beta$, and $\gamma$) in a phase-modulation amount of each cell as a parameter. Note here that the two-dimensional intensity distribution of the signal light $L_0$ inputted into the optical modulation element 11*b*1 means, for example, a set of intensities of signal light beams inputted into the respective cells included in the optical modulation element 11*b*1. Further, the two-dimensional intensity distribution of the signal light $L_n$ outputted from the optical modulation element 11*bn* means, for example, a set of intensities of signal light beams inputted into respective cells included in a two-dimensional image sensor provided in a stage subsequent to the optical modulation element 11*bn*.

(Example Configuration of Transmissive Optical Modulation Element)

Figure 4:
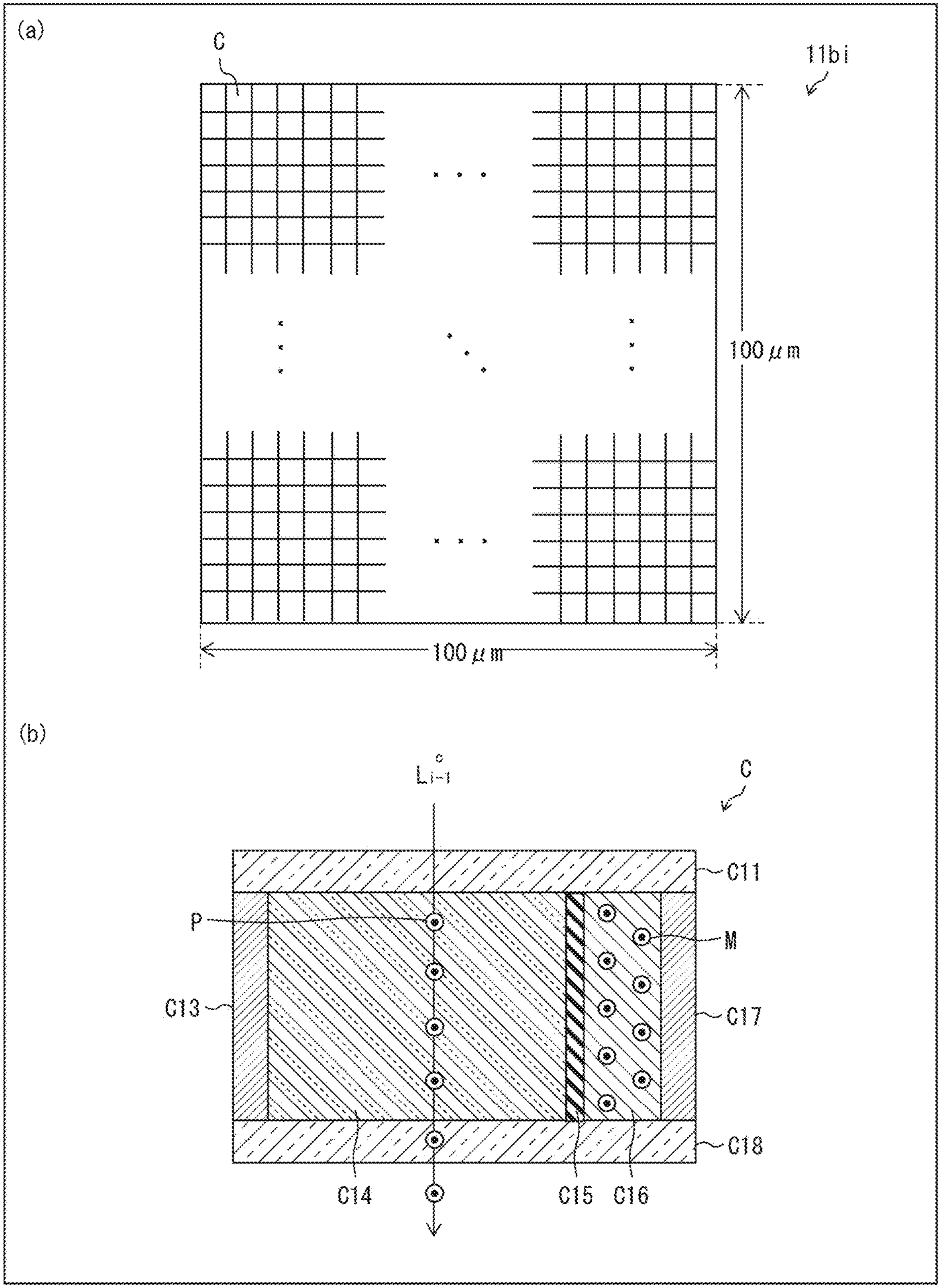
FIG. 4 shows a plan view illustrating a transmissive optical modulation element included in the optical computing device illustrated in FIG. 2 and a cross-sectional view of a cell included in the optical modulation element.

The following description will discuss, with reference to FIG. 4, an example configuration of a transmissive optical modulation element 11*bi* included in the optical computing device 1A. (a) of FIG. 4 is a plan view of an optical modulation element 11*bi* in accordance with the present specific example. (b) of FIG. 4 is a cross-sectional view of a microcell C included in the optical modulation element 11*bi* in accordance with the present specific example.

As shown in (a) of FIG. 4, the optical modulation element 11*bi* includes a plurality of microcells C having respective phase-modulation amounts that are set independently of each other. When signal light $L_{i-1}^c$ for computing enters the optical modulation element 11*bi*, the signal light $L_{i-1}^c$ for computing passes through the microcells C while being phase-modulated, and signal light beams $L_{i-1}^c$ for computing thus phase-modulated by the microcells C interfere with each other. Consequently, signal light $L_i$ indicative of a result of computation is formed.

The optical modulation element 11$bi$ shown in (a) of FIG. 4 as an example includes 200×200 microcells C arranged in matrix. A shape of each microcell C in a plan view is a square of 500 nm×500 nm. A shape of the optical modulation element 11$bi$ in a plan view is a square of 100 μm×100 μm.

For example, as shown in (b) of FIG. 4, each microcell C included in the optical modulation element 11$bi$ may include a polarizing plate C11, a polarizing plate C18, a first electrode C13, a magnetization free layer C14, an insulating layer C15, a magnetization fixed layer C16, and a second electrode C17.

The polarizing plate C11 and the polarizing plate C18 are disposed opposite to each other. The first electrode C13, the magnetization free layer C14, the insulating layer C15, the magnetization fixed layer C16, and the second electrode C17 are stacked in this order, and are sandwiched between the polarizing plate C11 and the polarizing plate C18. Here, a direction in which the first electrode C13, the magnetization free layer C14, the insulating layer C15, the magnetization fixed layer C16, and the second electrode C17 are stacked is orthogonal to a direction in which the polarizing plate C11 and the polarizing plate C18 are stacked. Thus, a first side surface of the magnetization free layer C14 is in surface contact with one of main surfaces of the polarizing plate C11, and a second side surface of the magnetization free layer C14 which is located opposite to the first side surface is in surface contact with one of main surfaces of the polarizing plate C18. The signal light $L_{i-1}^c$ for computing (1) enters an inside of the magnetization free layer C14 via the polarizing plate C11, (2) passes through the magnetization free layer C14, and (3) is emitted through the polarizing plate C18 to an outside of the magnetization free layer C14.

The magnetization free layer C14 is made of, for example, a soft magnetic material having electric conductivity and light transmissivity (for example, CoFeB). The magnetization fixed layer C16 is made of, for example, a hard magnetic material having electric conductivity (for example, permalloy). Selected as the polarizing plate C11 and the polarizing plate C18 is a polarizing plate that selectively allows, to pass therethrough, a polarized light component having a polarization direction P parallel to a magnetization direction M of the magnetization fixed layer C16. (b) of FIG. 4 takes as an example a case in which the magnetization direction M and the polarization direction P are parallel to both (i) the main surfaces of the polarizing plate C11 and (ii) main surfaces of the magnetization fixed layer C16.

When a potential difference is provided between the first electrode C13 and the second electrode C17, a tunnel effect occurs and injects a spin current (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is magnetization parallel to the magnetization direction M of the magnetization fixed layer C16, that is, magnetization parallel to the polarization direction P of the signal light $L_{i-1}^c$ for computing which enters the magnetization free layer C14 through the polarizing plate C11. This causes a phase of the signal light $L_{i-1}^c$ for computing to be delayed by a transverse Kerr effect during a process of transmission in the magnetization free layer C14.

Here, a phase-shift amount of the signal light $L_{i-1}^c$ for computing in the cell C is determined depending on a magnitude of the magnetization in the magnetization free layer C14. The magnitude of the magnetization in the magnetization free layer C14 is determined depending on a magnitude of the spin current injected into the magnetization free layer C14. The magnitude of the spin current injected into the magnetization free layer C14 is determined depending on the potential difference provided between the first electrode C13 and the second electrode C17. Thus, controlling the potential difference provided between the first electrode C13 and the second electrode C17 enables the phase-modulation of the cell C to be set to a desired value.

Although the description in the present configuration example has discussed a microcell C having a configuration similar to that of a spin transfer torque (STT)-magnetoresistive random access memory (MRAM), this should not be construed as a limitation. For example, a microcell C having a configuration similar to a spin orbit torque (SOT)-MRAM may be used. Note that such a microcell C can be achieved by, for example, removing the insulating layer C15, the magnetization fixed layer C16, and the second electrode C17 from the structure shown in (b) of FIG. 4. In this case, for example, causing the first electrode C13 to contain heavy metal and providing a pulse voltage or a pulse current to the first electrode C13 enables the spin current to be efficiently injected into the magnetization free layer C14.

Figure 6:
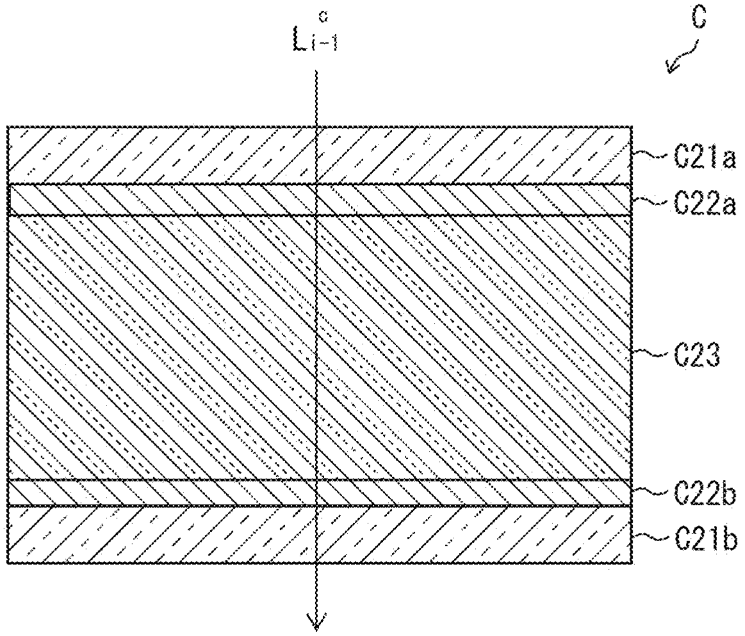
FIG. 6 is a cross-sectional view illustrating another transmissive optical modulation element included in the optical computing device illustrated in FIG. 2.

Further, the cell C can be configured in a similar manner to a cell of a liquid crystal display (LCD). In this case, the cell C includes, for example, a first glass substrate C21$a$, a first transparent electrode C22$a$, a liquid crystal layer C23, a second transparent electrode C22$b$, and a second glass substrate C21$b$ as illustrated in FIG. 6. The first glass substrate C21$a$, the first transparent electrode C22$a$, the liquid crystal layer C23, the second transparent electrode C22$b$, and the second glass substrate C21$b$ are stacked in this order from a side from which signal light $L_{i-1}^c$ for computing enters.

The signal light $L_{i-1}^c$ for computing (1) passes through the first glass substrate C21$a$ and the first transparent electrode C22$a$, (2) passes through the liquid crystal layer C23, and (3) passes through the second transparent electrode C22$b$ and the second glass substrate C21$b$. The liquid crystal layer C23 is made of liquid crystal molecules oriented in a direction parallel to main surfaces of the glass substrate C21, and has a refractive index according to a potential difference between the first transparent electrode C22$a$ and the second transparent electrode C22$b$. As such, the signal light $L_{i-1}^c$ for computing is phase-modulated when passing through the liquid crystal layer C23. A phase-modulation amount of the cell C can be set to a desired value by controlling a potential difference given between the first transparent electrode C22$a$ and the second transparent electrode C22$b$.

(Variation of Control Section)

Figure 7:
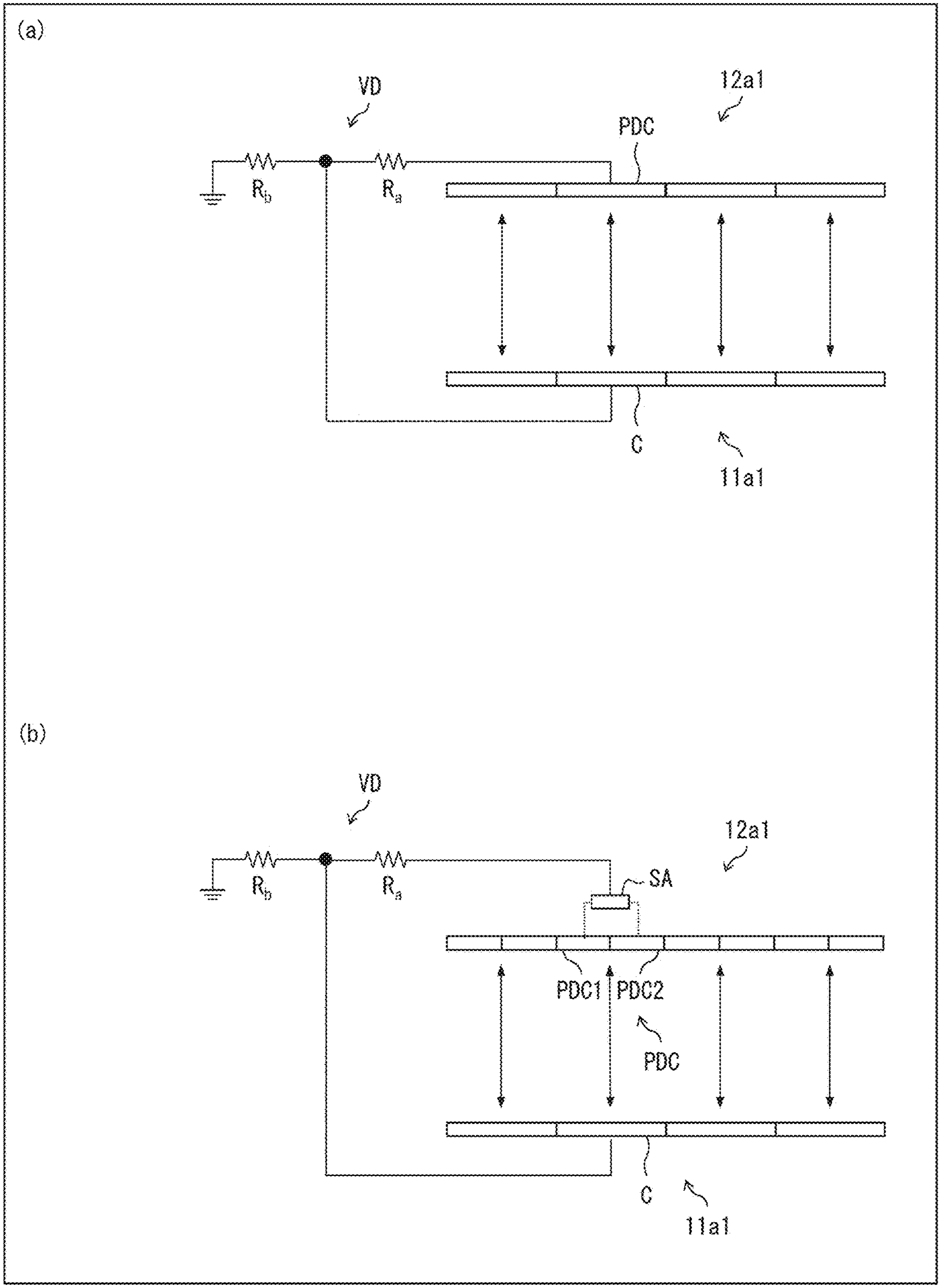
FIG. 7 shows block diagrams each illustrating a configuration in which an integrated circuit is used in place of a microcomputer as a control section illustrated in FIG. 1.
Figure 8:
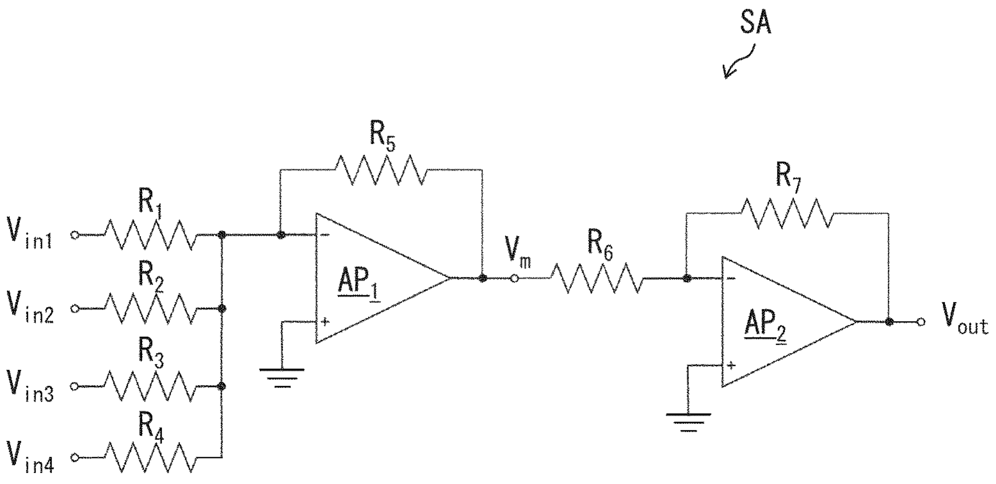
FIG. 8 is a circuit diagram illustrating an adding circuit illustrated in (b) of FIG. 7.

The following description will discuss, with reference to FIGS. 7 and 8, a variation of the control section 14 illustrated in FIG. 1. (a) and (b) of FIG. 7 are block diagrams each illustrating a configuration in which an integrated circuit is used in place of a microcomputer as the control section 14. In (a) and (b) of FIG. 7, an optical modulation element 11$a$1 is illustrated as an example of the optical modulation element 11$ai$, and an image sensor 12$a$1 is illustrated as an example of the image sensor 12$ai$. FIG. 8 is a circuit diagram illustrating an adding circuit SA illustrated in (b) of FIG. 7.

Note that, in (a) of FIG. 7, cells C of the optical modulation element 11$a$1 are in a one-to-one correspondence to light receiving cells PDC of the image sensor 12$a$1. In (b) of FIG. 7, cells C of the optical modulation element 11$a$1 are in a one-to-four correspondence to light receiving cells PDC of the image sensor 12$a$1. That is, in the configuration illustrated in (b) of FIG. 7, the light receiving cells PDC in the image sensor 12$a$1 have a vertical resolution and a horizontal resolution each of which is twice as high as that in the configuration illustrated in (a) of FIG. 7, and together, four times as high as those in the configuration illustrated in (a) of FIG. 7. In (a) and (b) of FIG. 7, an arrow between a cell C and a light receiving cell PDC facing each other represents that the cell C and the light receiving cell PDC facing each other face each other.

In the present variation, a voltage-dividing circuit VD consisting of two resistors $R_a$ and $R_b$ is used as the control section 14 which sets a phase-modulation amount of each cell C of the optical modulation element 11$a$1 in accordance with an intensity of signal light for monitoring which intensity is detected by a light receiving cell PDC corresponding to the cell C. With use of the voltage-dividing circuit VD, a voltage corresponding to the intensity of the signal light for monitoring which intensity is detected by the light receiving cell PDC is divided in accordance with a ratio between respective resistance values of the resistors $R_a$ and $R_b$, and a voltage corresponding to $R_b/(R_a+R_b)$ is applied to the cell C. The voltage applied from the voltage-dividing circuit VD to the cell C corresponds to a in a phase-modulation amount $\Delta\varphi(P)=P\times\alpha+\beta$ of each cell C of the optical modulation element 11$ai$, which phase-modulation amount $\Delta\varphi(P)$ is set by the control section 14.

For example, in a case where the optical modulation element 11$a$1 includes 200×200 cells C and the image sensor 12$a$1 includes 200×200 light receiving cells PDC, the control section 14 corresponding to the optical modulation element 11$a$1 and the image sensor 12$a$1 is constituted by an integrated circuit including 200×200 voltage-dividing circuits VD.

Note that, in a case where the cells C of the optical modulation element 11$a$1 are in an L-to-one correspondence to the light receiving cells PDC of the image sensor 12$a$1 (that is, each cell C is constituted by L subcells), the single voltage-dividing circuit VD illustrated in each of (a) and (b) of FIG. 7 may be replaced by L voltage-dividing circuits that are provided in parallel to each other. Since each voltage-dividing circuit corresponds to a subcell of a cell C, a voltage divided by the each dividing circuit is applied to the subcell of the cell C. Since each subcell is provided with a corresponding voltage-dividing circuit, a voltage to be applied after being divided can be adjusted for each subcell.

Further, in a case where the cells C of the optical modulation element 11$a$1 are in a one-to-four correspondence to the light receiving cells PDC of the image sensor 12$a$1 as illustrated in (b) of FIG. 7, each light receiving cell PDC is constituted by sub-light receiving cells PDC1 and PDC2 and two sub-light receiving cells that are not shown in (b) of FIG. 7. In this case, an intensity of signal light for monitoring detected by a light receiving cell PDC corresponding to a cell C is given by an average of respective intensities of signal light beams for monitoring which intensities are detected by the above-described four sub-light receiving cells. In the configuration illustrated in (b) of FIG. 7, the adding circuit SA is used in order to obtain the average of the intensities of the signal light beams for monitoring detected by the four sub-light receiving cells.

The adding circuit SA includes two amplifiers $AP_1$ and $AP_2$ and seven resistors $R_1$ to $R_7$ as illustrated in FIG. 8. In the present variation, the adding circuit AP is configured such that respective resistance values of the resistors $R_1$ to $R_4$ are equal to each other, a resistance value of $R_5$ is a quarter of that of each of $R_1$ to $R_4$, and respective resistance values of the resistors $R_6$ and $R_7$ are equal to each other. In the adding circuit AP thus configured, in a case where voltages $Vin_1$ to $Vin_4$ respectively corresponding to the intensities of the signal light beams for monitoring which intensities are detected by the four sub-light receiving cells are inputted to four input ports, $Vm=-(Vin_1+Vin_2+Vin_3+Vin_4)/4$ is obtained at an intermediate port, and $Vout=(Vin_1+Vin_2+Vin_3+Vin_4)/4$ is obtained at an output port.

Note that the present variation employs, as the image sensor 12$ai$, an image sensor that includes a light receiving cell PDC outputting a voltage corresponding to a detected intensity of signal light for monitoring. In one or more embodiments, however, it is also possible to employ, as the image sensor 12$ai$, an image sensor that includes a light receiving cell PDC outputting an electric current (electric charge) corresponding to a detected intensity of signal light for monitoring. Examples of the image sensor that includes a light receiving cell PDC outputting a voltage include a CMOS camera, and examples of the image sensor that includes a light receiving cell PDC outputting an electric current include a CCD camera. Note that, in the case where the image sensor that includes a light receiving cell PDC outputting an electric current is employed, a transimpedance amplifier may be provided in a stage subsequent to the light receiving cell PDC, and the outputted electric current may be converted into a voltage. According to this configuration, it is possible to apply the voltage-dividing circuit VD and the adding circuit SA described above, similarly as in the case where a light receiving cell outputting a voltage is employed.

Aspects of one or more embodiments can also be expressed as follows:

An optical computing device in accordance with Aspect 1 of one or more embodiments is an optical computing device, including: an image sensor including one or more light receiving cells; an optical modulation element including a plurality of cells having respective phase-modulation amounts that are settable independently of each other; an optical splitter element that splits signal light into signal light for monitoring and signal light for computing, the signal light for monitoring entering the image sensor, the signal light for computing entering the optical modulation element; and a control section that sets a phase-modulation amount of each of the plurality of cells of the optical modulation element in accordance with an intensity of the signal light for monitoring which intensity is detected by a light receiving cell of the image sensor, the light receiving cell corresponding to the each of the plurality of cells.

According to the above configuration, it is possible to carry out a wider variety of optical computing in comparison to a conventional optical computing device which carries out linear phase modulation at each cell of an optical modulation element.

An optical computing device in accordance with Aspect 2 of one or more embodiments employs, in addition to the configuration of Aspect 1, a configuration in which the control section sets a phase-modulation amount $\Delta\varphi(P)$ of each of the plurality of cells of the optical modulation element in accordance with $\Delta\varphi(P)=P\times\alpha+\beta$ where P is an intensity of the signal light for monitoring which intensity is detected by a cell of the image sensor, the light receiving cell corresponding to the each of the plurality of cells, and $\alpha$ and $\beta$ are each a constant.

According to the above configuration, it is possible to carry out a wider variety of optical computing in comparison to a conventional optical computing device which carries out linear phase modulation at each cell of an optical modulation element.

An optical computing device in accordance with Aspect 3 of the one or more embodiments employs, in addition to the configuration of Aspect 1 or 2, a configuration in which: a plurality of reflective optical modulation elements are provided as the optical modulation element; the signal light for monitoring is signal light that has passed through the optical splitter element; and the signal light for computing is signal light that has been reflected by the optical splitter element.

According to the above configuration, it is possible to carry out multi-stage optical computing with use of the reflective optical modulation elements.

An optical computing device in accordance with Aspect 4 of one or more embodiments employs, in addition to the configuration of Aspect 3, a configuration in which the plurality of reflective optical modulation elements are integral with each other.

According to the above configuration, it is possible to reduce the number of components included in the optical computing device. Further, it is possible to omit adjustment of alignment between the reflective optical modulation elements, which adjustment is required in a case where a plurality of reflective optical modulation elements are separate members.

An optical computing device in accordance with Aspect 5 of one or more embodiments employs, in addition to the configuration of Aspect 1 or 2, a configuration in which: a plurality of transmissive optical modulation elements are provided as the optical modulation element; the signal light for monitoring is signal light that has been reflected by the optical splitter element; and the signal light for computing is signal light that has passed through the optical splitter element.

According to the above configuration, it is possible to carry out multi-stage optical computing with use of the transmissive optical modulation elements.

An optical computing device in accordance with Aspect 6 of one or more embodiments employs, in addition to the configuration of any one of Aspects 1 to 5, a configuration in which: a plurality of combinations each consisting of the optical modulation element, the image sensor, and the optical splitter element are provided in multiple stages; and into the optical splitter element in each of second and subsequent stages, signal light generated by an optical modulation element in a stage preceding the each of the second and subsequent stages is inputted.

According to the above configuration, it is possible to carry out multi-stage optical computing.

An optical computing device in accordance with Aspect 7 of one or more embodiments employs, in addition to the configuration of any one of Aspects 1 to 6, a configuration in which the control section outputs, after respective phase-modulation amounts of all of the plurality of cells of the optical modulation element converge to a constant value, a signal that indicates that signal light representing a correct result of computation is outputted.

According to the above configuration, it is possible to reduce a risk that an output destination to which the signal is outputted refers to signal light indicative of an incorrect result of computation, which signal light can be outputted from the optical computing device before respective phase-modulation amounts of all of the cells of the optical modulation element converge to a constant value.

A control method in accordance with Aspect 8 of one or more embodiments is a method for controlling an optical computing device, the optical computing device including: an image sensor including one or more light receiving cells; an optical modulation element including a plurality of cells having respective phase-modulation amounts that are settable independently of each other; and an optical splitter element that splits signal light into signal light for monitoring and signal light for computing, the signal light for monitoring entering the image sensor, the signal light for computing entering the optical modulation element, the method including the step of setting a phase-modulation amount of each of the plurality of cells of the optical modulation element in accordance with an intensity of the signal light for monitoring which intensity is detected by a light receiving cell of the image sensor, the light receiving cell corresponding to the each of the plurality of cells.

According to the above method, it is possible to carry out a wider variety of optical computing in comparison to a conventional optical computing device which carries out linear phase modulation at each cell of an optical modulation element.

(Supplementary Note)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical computing device
11: Optical modulation element group
**11*a*1 to 11*an***: Optical modulation element (reflective)
**11*b*1 to 11*bn***: Optical modulation element (transmissive)
12: Image sensor group
**12*a*1 to 12*an***: Image sensor
13: Optical splitter element group
**13*a*1 to 13*an***: optical splitter element

The invention claimed is:

1. An optical computing device, comprising:

an image sensor including one or more light receiving cells;

one or more optical modulation elements each including cells that each have a phase-modulation amount;

an optical splitter element that splits signal light into monitoring signal light entering the image sensor and computing signal light entering the one or more optical modulation elements; and a controller that independently sets the phase-modulation amount of each of the cells in accordance with an intensity of the monitoring signal light detected by a corresponding one of the light receiving cells of the image sensor.

2. The optical computing device as set forth in claim 1, wherein the independently set phase-modulation amount satisfies $\Delta\varphi(P)=P\times\alpha+\beta$ where $\Delta\varphi(P)$ is the independently set phase-modulation amount, P is the intensity of the monitoring signal light detected by the corresponding light receiving cell, and $\alpha$ and $\beta$ are each a constant.

3. The optical computing device as set forth in claim 1, wherein the optical modulation elements are reflective optical modulation elements, the monitoring signal light passes through the optical splitter element, and the computing signal light is reflected by the optical splitter element.

4. The optical computing device as set forth in claim 3, wherein the reflective optical modulation elements are integral.

5. The optical computing device as set forth in claim 1, wherein the optical modulation elements are transmissive optical modulation elements, the monitoring signal light is reflected by the optical splitter element, and the computing signal light passes through the optical splitter element.

6. The optical computing device as set forth in claim 1, wherein combinations, each consisting of the one or more optical modulation elements, the image sensor, and the optical splitter element, are disposed in stages, and into the optical splitter element in each of second and subsequent stages, signal light, generated by the one or more optical modulation elements in a preceding stage, is inputted.

7. The optical computing device as set forth in claim 1, wherein after the phase-modulation amount of each of the cells converges to a constant value, a signal, indicating that signal light representing a correct result of computation, is outputted.

8. A method for controlling an optical computing device including an image sensor and one or more optical modulation elements, the image sensor including one or more light receiving cells and the one or more optical modulation elements each including cells that each have a phase-modulation amount, the method comprising:

splitting signal light into monitoring signal light entering the image sensor and computing signal light entering the one or more optical modulation elements; and independently setting the phase-modulation amount of each of the cells in accordance with an intensity of the monitoring signal light detected by a corresponding light receiving cell of the image sensor.

* * * * *